March 9, 1954
J. J. PESQUEIRA
2,671,371
EXPANDING MANDREL FOR LATHES
Filed March 16, 1950
3 Sheets-Sheet 1
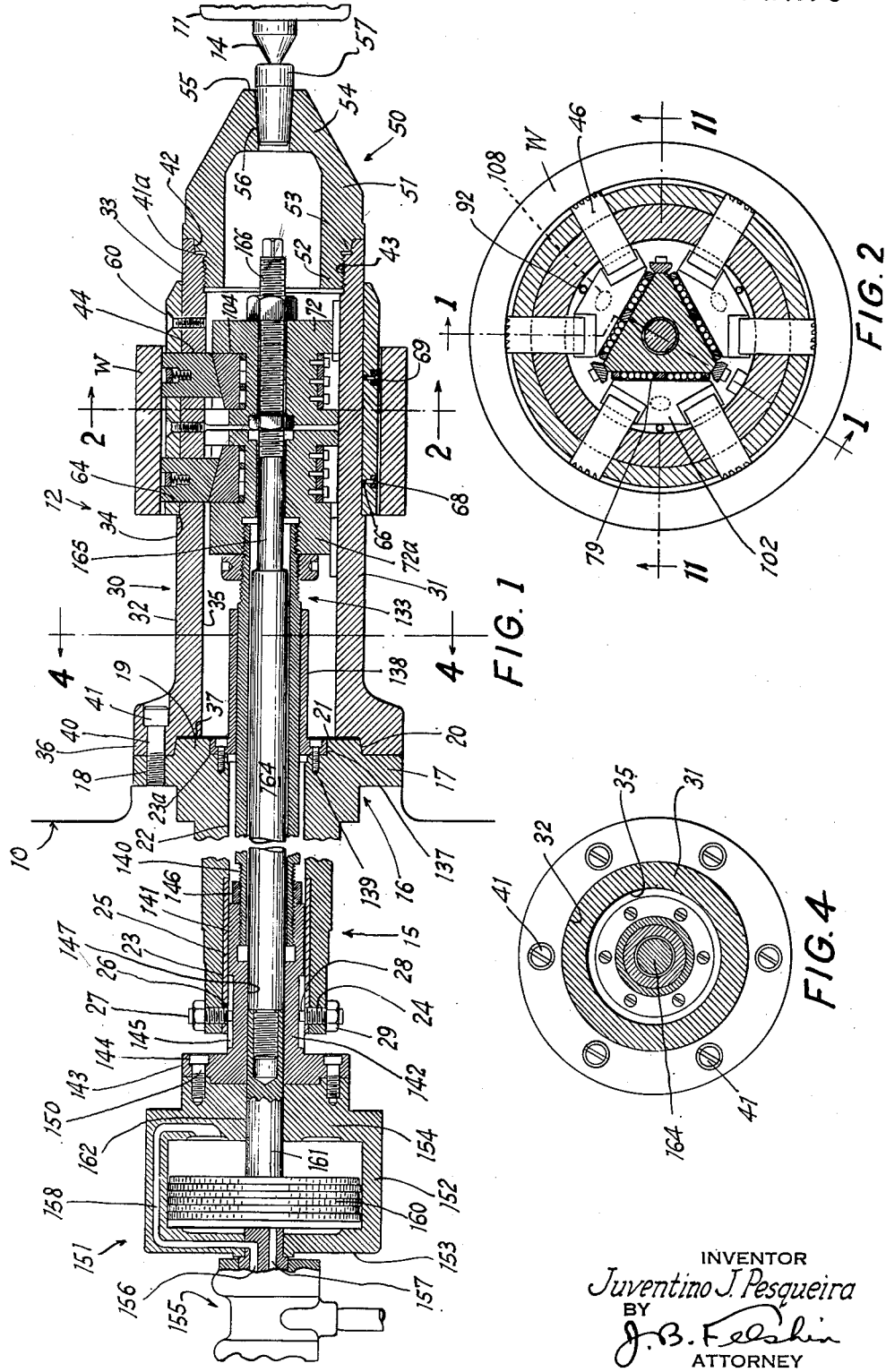
INVENTOR
Juventino J. Pesqueira
BY
J. B. Felshin
ATTORNEY March 9, 1954  J. J. PESQUEIRA  2,671,371
EXPANDING MANDREL FOR LATHES
Filed March 16, 1950  3 Sheets-Sheet 2
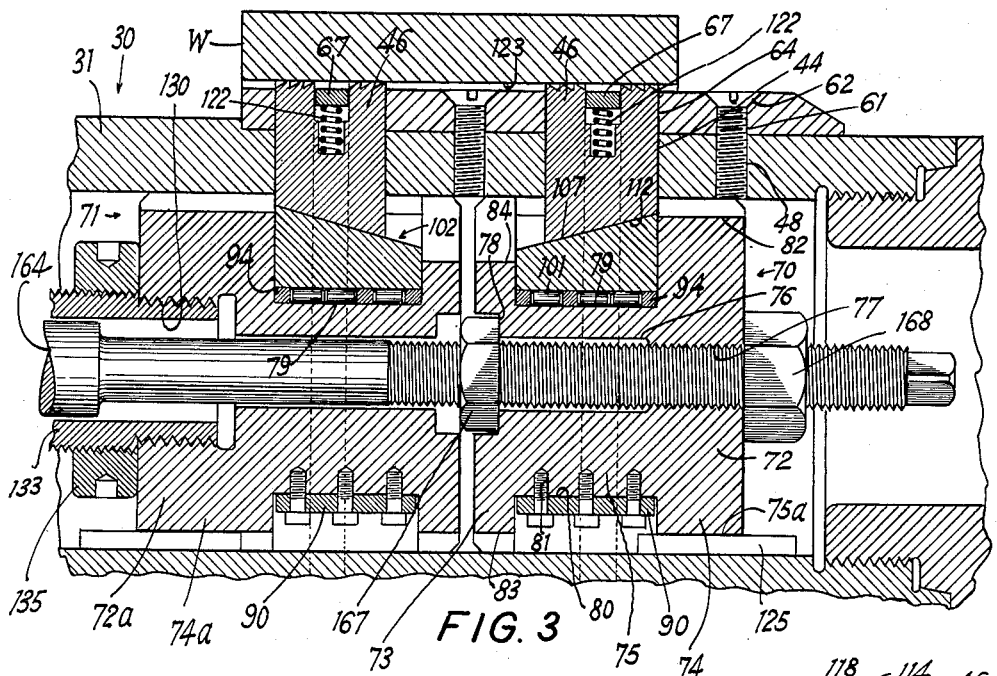
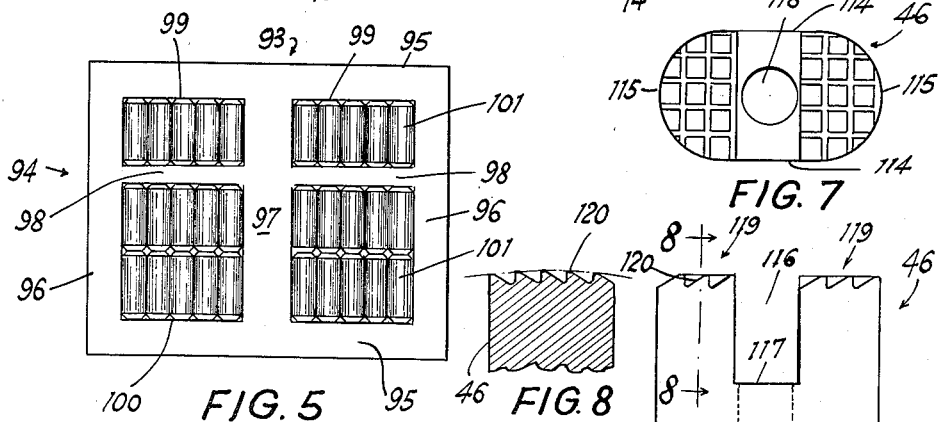
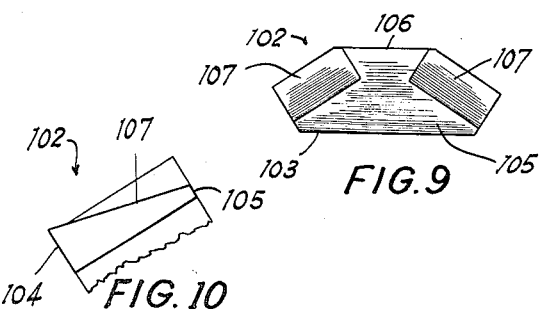
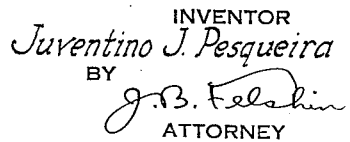
INVENTOR
Juventino J. Pesqueira
BY
ATTORNEY March 9, 1954 J. J. PESQUEIRA 2,671,371
EXPANDING MANDREL FOR LATHES
Filed March 16, 1950 3 Sheets-Sheet 3

INVENTOR
Juventino J. Pesqueira
BY
J. B. Felshin
ATTORNEY

Patented Mar. 9, 1954

2,671,371

UNITED STATES PATENT OFFICE 2,671,371

EXPANDING MANDREL FOR LATHES

Juventino J. Pesqueira, New York, N. Y., assignor to Morey Machinery Co., Inc., Astoria, N. Y., a corporation of New York Application March 16, 1950, Serial No. 150,020

8 Claims. (Cl. 82—44)

This invention relates to expanding mandrels for lathes for chucking sleeves for turning the outer surfaces of the sleeves.

Prior expanding mandrels were made with three radial jaws which were pressed outwardly to clamp the inside of the sleeve at three points. With such construction the chucking of the sleeve distorted the sleeve, there being a tendency to triangularize the sleeve. It is, therefore, an object of the present invention to provide a highly improved expanding mandrel for chucking rough sleeves, that is, sleeves having rough internal surfaces, said mandrel including two sets of wedging clamps, each provided with six equi-angularly spaced jaws. By pressing radially outwardly at six equi-angularly spaced points instead of three, the error due to distortion is considerably reduced. Thus, by the use of six jaw mandrels, the sleeve will have very little distortion and thus be closer to a circle after turned on and removed from the mandrel.

Yet a further object of this invention is to provide an expanding mandrel of the character described, in which each set of jaws comprises a triangular wedge holder with a wedge slidable on each face of the wedge holder, and a pair of jaws engaging a pair of beveled wedge surfaces on each wedge. With such construction, upon moving the triangular wedge holder, the wedges may slide sideways, so that one jaw may be thrust outwardly further than the other jaw on the same wedge to insure engagement of all six jaws of the set with the inner surface of the sleeve even if the inner surface is not a true circle.

Yet another object of this invention is to provide an expanding mandrel of the character described, so constructed that one wedge holder of a set of jaws floats longitudinally relative to another wedge holder of another set of jaws, so that one set can move radially more than the other set until all the jaws grip, thereby insuring gripping of all twelve jaws of the two sets of jaws with the inner surface of the sleeve. With such construction, if the sleeve has an inner tapering surface, the jaws will nevertheless grip the sleeve. The wedge holders of the two sets of jaws are moved toward each other to engage the jaws to the sleeve, but one wedge holder may move more than the other, so that movement can continue until the jaws find the sleeve.

Yet a further object of this invention is to provide a compact, sturdy and durable expanding mandrel of the character described, which shall be relatively inexpensive to manufacture, which shall be sure and positive in operation and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, Fig. 1 is a longitudinal cross-sectional view through an expanding mandrel embodying the invention, taken on line 1—1 of Fig. 2;

Fig. 2 is a cross-sectional view taken on line 2—2 of Fig. 1;

Fig. 3 is an enlarged view of a part of Fig. 1;

Fig. 4 is a cross-sectional view taken on line 4—4 of Fig. 1;

Fig. 5 is a top plan view of the roller cage on which the wedges slide;

Fig. 6 is a side elevational view of one of the jaws;

Fig. 7 is a top plan view of the jaw shown in Fig. 6;

Fig. 8 is a cross-sectional view taken on line 8—8 of Fig. 7;

Fig. 9 is a front elevational view of one of the wedges;

Fig. 10 is a partial side view of one of the wedges as directly projected from Fig. 9.

Figure 11:
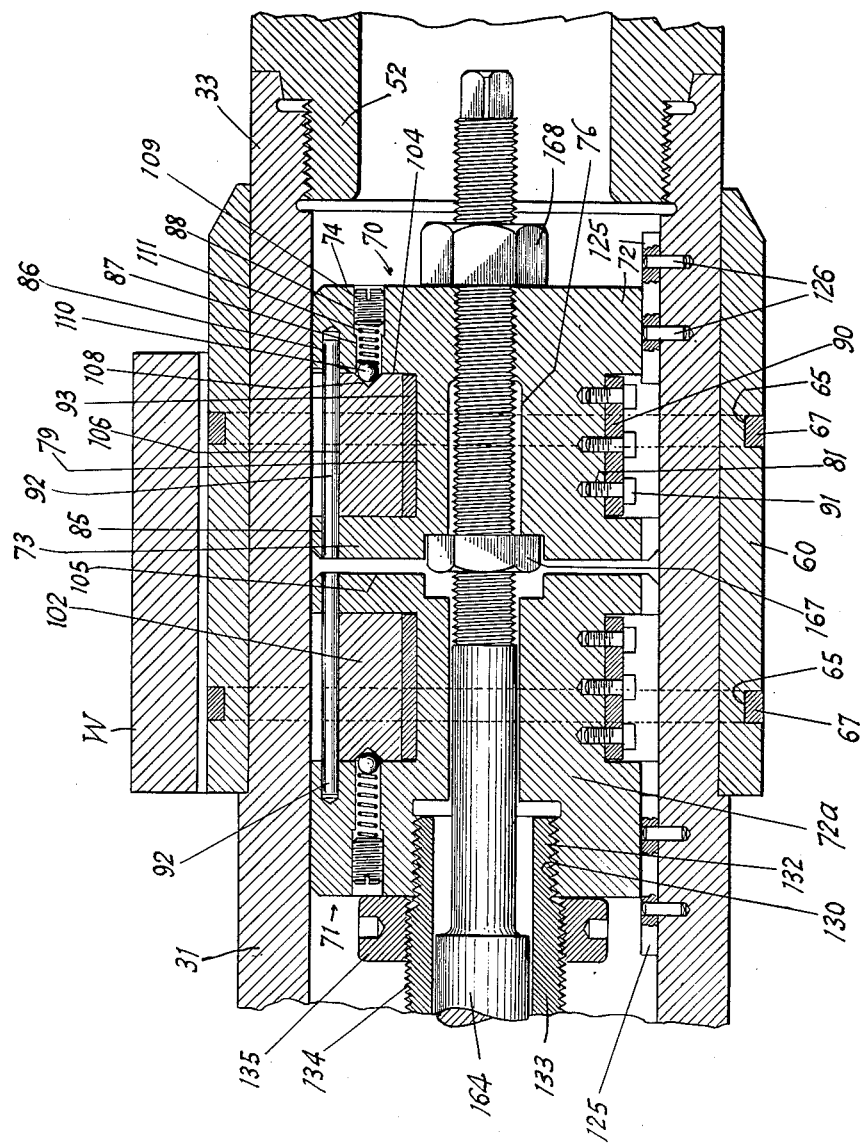
Fig. 11 is an enlarged cross-sectional view taken on line 11—11 of Fig. 2.

Referring now in detail to the drawing, 10 designates a head stock of a lathe, and 11 the tail stock; and 12 designates an expanding mandrel embodying the invention and supported on a lathe between the head stock and tail stock. The tail stock 11 includes a center 14.

The head stock 10 comprises a lathe spindle 15 mounted for rotation within the head stock in the usual manner. Any suitable means (not shown) may be provided for rotating the spindle. At the forward end of the spindle 15 is a spindle nose 16 comprising an outwardly extending annular flange 17 formed with a plurality of equi-angularly spaced screw-threaded openings 18 on a common circle and parallel to the axis of the spindle. Extending forwardly from the flange 17 is an annular boss 19 formed with a tapered outer surface 20 and a flat front face 21. The spindle 15 has an internal axial through opening 22 formed with an enlarged rear portion 23. The front surface 21 of the spindle nose 16 is formed with an annular recess 23a. At the rear end of the spindle are formed a pair of radial, diametrically opposed screw-threaded openings 24. Within the enlarged opening 23 is a bushing or sleeve 25 formed with through openings 26 registering with openings 24. Screwed through the openings 24 are studs 27 passing through the openings 26. At the inner ends of the studs 27 are projections 28. Screwed to the studs 27 are nuts 29. The pins 28 project radially inwardly of the internal surface of the bushing 25 for the purpose hereinafter appearing.

Fixed to the front end of the spindle is a mandrel body or housing 30. Said mandrel body comprises a cylindrical wall 31 having an intermediate outer cylindrical surface 32 from which extends a cylindrical surface 33 of reduced diameter forming a shoulder 34 therebetween. The body 30 is formed with an internal through opening 35. At one end of the body is an annular outwardly extending flange 36, and said end of the body is formed with a recess 37 to receive the boss 19 of the spindle. The flange 36 contacts the flange 17 and is formed with bolt openings 40 to receive bolts 41 screwed to the openings 18 for fastening the mandrel body to the nose of the spindle.

The opposite end of the mandrel body 30 is countersunk as at 41a, and the countersunk portion is formed with tapered annular surfaces 42. The inner surface 35 of the body is formed with internal screw threads 43 adjacent the countersunk opening 41a. The mandrel body 30 is formed with two sets of radial openings 44. There are six openings 44 in each set. The two sets are parallel to each other and the openings in each set are aligned with the openings in the other set. The openings in each set extend longitudinally of the body and are of a shape to slidably receive the jaws 46 to be described hereinafter. The openings thus have parallel side surfaces and curved end surfaces, to receive the jaws as will appear hereinafter.

Said body 31 is furthermore formed with two sets of radial screw threaded openings 48, there being three openings in each set spaced 120° apart. One set of openings is preferably located between the two sets of openings 44, and the other set is located between one of the sets of openings 44 and the forward end of the body.

Screwed to the forward end of the body is a nose piece 50. Said nose piece 50 comprises a cylindrical wall 51 having at one end a reduced externally screw threaded portion 52 screwed to the screw threads 43 of the mandrel body. Adjacent the screw threaded portion 52 is a shoulder portion 53, which fits within the tapered recess 41a and contacts the tapered surface 42. Extending forwardly from the cylindrical wall 51 is a tapered wall 54. At the forward end of the tapered wall 54 is a front end 55 formed with a tapered through opening 56 receiving a tapered plug 57. Said plug receives the center 14 of the tail stock 11. It will now be understood that the mandrel body 30 and nose 50 rotate together with the spindle about the axis of the spindle.

Received on the surface 33 of the mandrel body is an annular sleeve 60 contacting the shoulder 34. The sleeve 60 terminates short of the forward end of the body. It is formed with two sets of countersunk openings 61 registering with the openings 48 to receive cap screws 62 for fastening the sleeve to the body. The sleeve 60 is formed with two sets of through openings 64 registering with the two sets of openings 44 in the mandrel body. Said sleeve is furthermore formed with a pair of external annular grooves 65 traversing the two sets of openings 64 respectively. At the bottom of the grooves are radial screw threaded openings 66. Within each annular groove 65 is an annular retainer ring 67. Said retainer rings traverse the openings 64 and are fixed to the sleeve by means of screws 68 passing through countersunk openings 69 registering with the screw threaded openings 66, and screwed into said openings 66.

Mounted on the mandrel body are two clamp sets 70 and 71. Said sets are substantially similar except for certain differences to be pointed out hereinafter. In each clamp set are six of the aforementioned clamp jaws 46, the clamp jaws of each set being similar to the clamp jaws of the other set, but symmetrically disposed with respect thereto.

The clamp set 70 comprises a right hand wedge holder 72. Said wedge holder comprises a pair of spaced annular flanges 73 and 74 interconnected by an intermediate portion 75. Said wedge holder is formed with an axial through opening 76. One end of the through opening is screw threaded as at 77. At the opposite end of the through opening 76 is a countersunk hole 78. The intermediate portion 75 is of triangular cross-section having three flat faces 79 parallel to the axis of said wedge holder and spaced apart 120° and between said flat faces 79 are flat corners 80. The faces 79 are tangent to a common cylinder coaxial with the mandrel body. The corner surfaces 80 are each formed with a plurality of aligned radial screw threaded openings 81.

The flange 74 is formed with a longitudinal key slot 75a. It is also formed with six equiangularly spaced shallow notches 82 slightly wider than jaws 46. The flange 73 is formed with a key slot 83 aligned with the key slot 75a. It is also formed with six relatively deep notches 84 aligned with the notches 82, likewise slightly wider than jaws 46. The flange 73 is formed with three longitudinal through openings 85 parallel to the axis of member 72. The openings 85 are located adjacent the periphery of the flange 73 and they are spaced apart 120°. Each opening is in a longitudinal plane perpendicular to one of the flat surfaces 79.

The flange 74 is formed at its inner side with three blind openings 86 similar to and aligned with the openings 85. Said flange 74 is furthermore formed with three through openings 88 spaced 120° apart and disposed in planes passing through the axis of the openings 86 and perpendicular to the flat surface 79. The rear ends of said openings 87 are internally screw threaded.

Contacting each flat surface 89 is a longitudinal stop bar 90 held against said surface by three screws 91 screwed into the threaded openings 81. The stop bars 90 are located between the flanges 74 and 73. Extending through each opening 85 and projecting into the opening 86 aligned thereto is a longitudinal pin 92. The pins 92 traverse the spaces between flanges 74 and 73 and their purpose will be described hereinafter.

Slidably mounted on each flat surface 79 is a roller retaining cage 93 (see Fig. 5). Each retaining cage 93 comprises a rectangular frame 94 having parallel side portions 95 connected by parallel end portions 96. The side portions 95 are interconnected by a transverse portion 97.

The transverse portion 97 is interconnected to the end portions 96 by portions 98 parallel to the portions 95 but closer to one of said portions than the other. The frame 94 is thus divided by the portions 97, 98 into a pair of aligned openings 99 of lesser width, and a pair of openings 100 of greater width. Within the openings 99 and 100 are rows of rollers 101 contacting the flat surface 79. The rollers 101 extend longitudinally relative to the axis of the mandrel. It will now be understood that there are three retaining cages, one on each of the flat surfaces 79.

Mounted on each retaining cage is a wedge 102 (see Figs. 9 and 10). Each wedge 102 has a bottom surface 103 contacting the rollers 101. It has a front face 104 contacting the inner surface of flange 74 and a rear face 105 contacting the inner surface of flange 73. It has a top surface 106 contacted by the pin 92. Each wedge is furthermore formed with a pair of upwardly inclined surfaces 107 which extend from the rear surface 105 to the front surface 104. The beveled surfaces 107 are symmetrical with respect to one another. Planes perpendicular to the surfaces 107 pass through the axis of the mandrel. Said beveled surfaces are tangent to a common cone coaxial with the axis of the wedge holder 72. The pins 92 serve to hold the wedges on the wedge holder 72 should said member be taken out of the mandrel.

The front surfaces 104 of the wedges 102 are each formed with conical openings 108. Screwed to the threaded openings 88 are set screws 109. Within each opening 87 and contacting the bottom of the groove 108 is a ball 110. Between each ball 110 and the set screw 109 associated therewith is a coil compression spring 111. The springs 111 press the balls 110 into the openings 108 and serve to center the wedges when the device is not in operational use. The beveled surfaces 107 are disposed below the registering openings 44 and 64 on one side of the mandrel.

Referring now to the jaws 46, each jaw has a beveled undersurface 112 corresponding or complementary to and contacting one of the beveled surfaces 107. Each jaw 46 has parallel side surfaces 114 and half-round outer surfaces 115, so as to slidably fit within the openings 44, 64. Each jaw 46 is formed into the top with a transverse slot 116 extending from one surface 114 to the other. At the bottom of the slot or groove 116 is a surface 117. Each jaw is furthermore formed with an opening 118 extending downwardly from the surface 117. It will thus be noted that each jaw has a bifurcated upper end 119. The upper bifurcated ends 119 are formed with top serrations or teeth 120 extending straight longitudinally, but being curved transversely, as shown in Fig. 8 of the drawing.

It will be noted that one of the retaining rings 67 passes through the slots 116 in the jaws 46. Interposed between the retaining ring and each jaw is a coil compression spring 122, one end of which is received in the opening 118 of said jaw. It will now be understood that the springs 122 tend to move the jaws radially inwardly and to keep them pressed against the beveled surfaces 107. It will not be understood that should the clamp 70 be moved to the right, looking at Fig. 3 of the drawing, the springs 122 will tend to move the jaws 46 radially inwardly as they slide down the beveled surfaces 107, to release the sleeve-like work piece or ring W which surrounds the mandrel. As the clamp set 70 is moved to the left, looking at Fig. 3, the six jaws 46 are pressed radially outwardly to grip the inner surfaces 123 of the work piece W.

Received within the key slot 75a is a key 125, which may be doweled to the mandrel body by dowel pins 126. The key 125 thus permits longitudinal sliding movement of the clamp set 70, but does not permit rotation thereof relative to the mandrel body.

The clamp set 71 comprises a left-handed wedge holder substantially similar to and symmetrical with the wedge holder 72. The wedge holder 72a of clamp set 71, however, is formed at its rear end with an internal screw-threaded recess 130. It has a flange 74a, which corresponds to the flange 74 of member 72, and may be of somewhat greater longitudinal length. Member 72a is likewise provided with three flat surfaces 79 on which are mounted retaining cages 94. It also carries the stop bars 99. Mounted on each retaining cage 94 is a wedge 102. The wedges 102 are likewise held from outward radial movement by pins 92 and they are centered by spring-pressed balls the same as are the wedges in the clamp set 70. Also, they are kept from turning by a key 125 in key slot 75a doweled to the mandrel body. Mounted on each wedge 102 are also a pair of radial jaws 46 pressed inwardly by springs 122 interposed between the jaws and a retainer ring 67. In other words, the clamp sets 70 and 71 are constructed and operate the same except in opposite directions and they are symmetrical to one another. Both are longitudinally movable.

It will be noted that if the interior surface of the work piece W is not a true circle, nevertheless, all the jaws will contact the inner surface of said work piece for the reason that each wedge is slidable sidways on a retaining cage 94. The movement of any wedge in one direction presses one of its jaws more outwardly and permits the other of its jaws to move more inwardly. The wedges will thus move either to the right or left as the wedges float and the jaws will move until they are firmly clamped against the inner surface of the work piece.

Means is provided to move the clamp sets either inwardly toward each other or outwardly away from each other, with a floating arrangement, so that said clamp sets will float longitudinally relative to each other, whereby one set can move more than the other, until all the jaws grip the inner surface of the work piece to insure grip of all twelve jaws with the inner surface of the work piece, even if the work piece should taper internally. To this end there is screwed to the internal screw-threaded opening 130, an external screw-threaded end 132 of an axial sleeve 133. Sleeve 133 also has an external screw threaded portion 134, on which is screwed a nut 135, which may be tightened against the wedge holder 72a. The sleeve 133 passes axially through the mandrel body 30 and into the spindle 15. Received within the recess 23a of the nose of the spindle, is a flange 137 at one end of a guide sleeve or bushing 138, which supports the sleeve 133. The flange 137 is attached to the nose of the spindle by means of screws 139, screwed into suitable openings in the spindle nose.

The rear end of the sleeve 133 is reduced and has external screw threads 140. Screwed thereto is an internal screw-threaded end 141 of a sleeve 142, which projects rearwardly beyond the spindle, and is formed at its rear end with an annular outwardly extending flange 143. Said flange is formed with bolt holes 144. The sleeve 142 is formed with a pair of diametrically disposed longitudinal external slots 145, into which the projections 28 on the studs 27 project. The studs 27 thus permit longitudinal sliding movement of sleeve 142 and hence sleeve 133, together with the wedge holder 72a, but prevent rotation thereof relative to the spindle or mandrel body. Screwed to the threaded portion 140 is a nut 146 contacting the outer end of the sleeve 142. The sleeve 142 is formed with a reduced axial through opening 147 for the purpose hereinafter appearing.

It will be noted that the internal screw-threaded end 141 of the sleeve 142 has a greater internal diameter than the axial opening 147, so as to receive the reduced screw-threaded portion 140 of the sleeve 133.

Attached to the flange 143 by bolts 150 is a hydraulic cylinder 151. Said cylinder may be a hydraulic double acting cylinder. The cylinder 151 has an outer cylindrical portion 152 and end walls 153 and 154. Mounted on the end wall 153 is a usual fitting 155 having passages 156 and 157. The passage 157 communicates with the interior of one end of the cylinder chamber, and the opening 156 communicates with the passage 158 passing through walls 152, 153 and 154 and communicating with the opposite end of the cylinder chamber.

Within the cylinder chamber is a piston 160 provided with a piston stem 161 passing through an axial opening 162 in wall 154 and projecting into the axial opening 147 of sleeve 142. Screwed to one end of the piston stem 161 is an axial shaft 164 passing through sleeves 142 and 133 and provided with a reduced axial stem 165 passing through the axial openings in the wedge holders 72 and 72a. The outer end of the stem 165 is screw-threaded as at 166 and screwed thereto are nuts 167 and 168 contacting opposite ends of the wedge holder 72. The nut 167 is disposed within the recess 78 of wedge holder 72.

It will now be understood that the sleeve 133 interconnects the wedge holder 72a to the cylinder 151, whereas the shaft 164 connects the wedge holder 72 to the piston 160. When hydraulic medium is directed to the passages 156 and 158 to the right side of the piston 150, looking at Fig. 1 of the drawing, the piston is moved to the left relative to the cylinder and the cylinder 151 is moved to the right relative to the piston, causing the wedge holders 72, 72a to move toward each other for pressing the jaws 46 radially outwardly to engage the inner surface of the work piece W. When hydraulic medium is passed through the passage 157 to the left side of the piston, the piston is moved to the right relative to the cylinder 151 and the wedge holders 72, 72a move away from each other to relieve the pressure of the jaws on the work piece and to retract them sufficiently, so that the work piece may be taken off the mandrel.

It will now be understood that there is a floating connection between the cylinder and the piston and hence a corresponding floating connection between the two clamp sets, so that should the interior surface of the work piece be tapered or conical, the clamp sets will, nevertheless, move to such positions that all twelve of the jaws will contact the interior surface of the work piece.

The advantage of the present construction will now be understood. Ordinary expanding mandrels now in use have three jaws to engage the interior of the work piece. The use of three jaws spaced 120° apart makes for distortion of the work piece. The tendency with such an expanding mandrel is to triangularize the sleeve or work piece. With six jaws, the distortion is less. It has been found that if three jaws are used to chuck a ring and the error or distortion from a true circle due to triangularization is indicated by the letter E, the use of six jaws will reduce the error or distortion to about E/9.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described by invention, I claim as new and desire to secure by Letters Patent:

1. In a lathe having a head stock and a tail stock, a hollow spindle rotatably mounted on the head stock, a mandrel body fixed to one end of the spindle and coaxial therewith, a nose on the body engaging the tail stock, a pair of wedge holders of polygonal cross section, within the mandrel body, a plurality of wedges slidably mounted on each wedge holder in flat planes transversely of the axis of the body, said planes being tangent to a common cylinder coaxial with the body, each wedge having a pair of beveled surfaces, the beveled surfaces of the wedges on each holder being tangent to a common cone coaxial with the body, and a jaw engaging each beveled surface, said jaws being radial with respect to the axis of the body, the jaws on the wedges on each wedge holder being in a common plane, said body having radial openings, through which said jaws slidably project, and means for moving said wedge holders relatively toward each other and relatively away from each other and relative to the body and each holder independently of the other.

2. In a lathe having a head stock and a tail stock, a hollow spindle rotatably mounted on the head stock, a mandrel body fixed to one end of the spindle and coaxial therewith, a nose on the body engaging the tail stock, a pair of wedge holders of polygonal cross section, within the mandrel body, a plurality of wedges slidably mounted on each wedge holder in flat planes transversely of the axis of the body, said planes being tangent to a common cylinder coaxial with the body, each wedge having a pair of beveled surfaces, the beveled surface of the wedges on each holder being tangent to a common cone coaxial with the body, and a jaw engaging each beveled surface, said jaws being radial with respect to the axis of the body, the jaws on the wedges on each wedge holder being in a common plane, said body having radial openings, through which said jaws slidably project, and means for moving said wedge holders relatively toward each other and relatively away from each other and relative to the body and each holder independently of the other, said means comprising a hydraulic cylinder slidable and nonrotatable with respect to the spindle, means to connect said cylinder to one of said wedge holders, a piston within said cylinder, and means to connect the piston to the other of said wedge holders.

3. In a lathe having a head stock and a tail stock, a hollow spindle rotatably mounted on the head stock, a mandrel body fixed to one end of the spindle and coaxial therewith, a nose on the body engaging the tail stock, a pair of wedge holders of polygonal cross section, within the mandrel body, a plurality of wedges slidably mounted on each wedge holder in flat planes transversely of the axis of the body, said planes being tangent to a common cylinder coaxial with the body, each wedge having a pair of beveled surfaces, the beveled surfaces of the wedges on each holder being tangent to a common cone coaxial with the body, and a jaw engaging each beveled surface, said jaws being radial with respect to the axis of the body, the jaws on the wedges on each wedge holder being in a common plane, said body having radial openings, through which said jaws slidably project, means for moving said wedge holders relatively toward each other and relatively away from each other, said means comprising a hydraulic cylinder slidable and non-rotatable with respect to the spindle, means to connect said cylinder to one of said wedge holders, a piston within said cylinder, means to connect the piston to the other of said wedge holders and a sleeve surrounding said mandrel body and formed with openings through which said jaws project, said sleeve being formed with a pair of external grooves crossing the openings therein, retaining rings within said grooves, said jaws having slots through which said retaining rings pass, and springs interposed between said retaining rings and jaws.

4. In a lathe, a mandrel body, a wedge holder longitudinally slidable and non-rotatably mounted within said mandrel body and coaxial therewith, said wedge holder having a plurality of flat surfaces parallel to the axis of the body and tangent to a common cylinder coaxial with the body, a wedge slidable transversely on each surface and provided with a pair of beveled surfaces, all of said beveled surfaces being in planes inclined to the axis of the body and tangent to a common cone coaxial with the body, a jaw on each beveled surface having a complementary beveled surface contacting the same, said body having radial openings, through which said jaws project, and means for causing sliding movement of said wedge holder longitudinally relative to the body.

5. In a lathe, a mandrel body, a pair of wedge holders within the mandrel body longitudinally slidable and non-rotatable with respect thereto and coaxial therewith, said wedge holders having flat surfaces parallel to the axis of the body and tangent to a common cylinder coaxial with the body, a wedge slidable transversely on each surface, the wedges on each wedge holder each having a pair of beveled surfaces, all of said beveled surfaces being in planes tangent to a common cone coaxial with the mandrel body, and a gripping jaw on each beveled surface and having a complementary beveled surface contacting the same, said mandrel having openings, through which said jaws radially project, and means for slidably moving the wedge holders longtiudinally relative to said mandrel body, said means comprising means to move one wedge holder without moving the other wedge holder.

6. In a lathe, a mandrel body, a pair of wedge holders within the mandrel body longitudinally slidable and non-rotatable with respect thereto and coaxial therewith, said wedge holders having flat surfaces parallel to the axis of the body and tangent to a common cylinder coaxial with the body, a wedge slidable transversely on each surface, the wedges on each wedge holder each having a pair of beveled surfaces, all of said beveled surface being in planes tangent to a common cone coaxial with the mandrel body, and a gripping jaw on each beveled surface and having a complementary beveled surface contacting the same, said mandrel having openings, through which said jaws radially project, and means for slidably moving the wedge holders longitudinally relative to said mandrel body, said means comprising a hydraulic cylinder slidable with respect to said mandrel body and rotatable therewith, means to connect said cylinder with one of said wedge holders, a piston slidably mounted within said cylinder and means to attach said piston to the other of said wedge holders.

7. In a lathe, a mandrel body, a pair of wedge holders within the mandrel body longitudinally slidable and non-rotatable with respect thereto and coaxial therewith, said wedge holders having surfaces parallel to the axis of the body and tangent to a common cylinder coaxial with the body, a wedge slidable transversely on each surface, the wedges on each wedge holder each having a pair of beveled surfaces, all of said beveled surfaces being in planes tangent to a common cone coaxial with the mandrel body and a gripping jaw on each beveled surface and having a complementary beveled surface contacting the same, said mandrel having openings, through which said jaws radially project, means for slidably moving the wedge holders longitudinally relative to said mandrel body, said means comprising a hydraulic cylinder slidable with respect to said mandrel body and rotatable therewith, means to connect said cylinder with one of said wedge holders, a piston slidably mounted within said cylinder, means to attach said piston to the other of said wedge holders and a sleeve on said mandrel body and formed with openings registering with the openings in said body and through which said jaws project, said sleeve being formed with a pair of external grooves, crossing said openings in said sleeve, a retaining ring in each groove, and springs interposed between said retaining rings and said jaws.

8. In combination, a mandrel body, a pair of wedge holders slidable longitudinally therein, means to retain said holders against rotation relative to said body, each holder being formed with a plurality of flat surfaces tangent to a common cylinder coaxial with the body, and perpendicular to planes passing through the axis of the body and spaced apart equiangularly from each other, a wedge slidable on each surface transversely of the axis of the body, the wedges on each wedge holder each having a pair of beveled surfaces, the beveled surfaces on the wedges of one wedge holder being tangent to a common cone coaxial with the mandrel body, each wedge on the wedges of the other holder having a pair of beveled surfaces tangent to a common cone coaxial with the mandrel body and symmetrical to the first mentioned cone, a gripping jaw on each beveled surface having a beveled surface complementary to the beveled surfaces contacting the same, all of said jaws being radial with respect to the axis of the mandrel body, said mandrel body having openings through which said jaws project, and means for slidably moving the wedge holders relative to said mandrel body.

JUVENTINO J. PESQUEIRA.

References Cited in the file of this patent

UNITED STATES PATENTS

| Number | Name | Date |
|---|---|---|
| 586,210 | Tucker | July 13, 1897 |
| 749,202 | Klay | Jan. 12, 1904 |
| 1,074,280 | Miller | Sept. 30, 1913 |
| 1,191,092 | Notz | July 11, 1916 |
| 1,334,335 | Warren et al. | May 23, 1920 |
| 1,522,770 | Dunstan | Jan. 13, 1925 |
| 1,708,228 | Lovely | Apr. 9, 1929 |
| 1,909,323 | Warren | May 16, 1933 |
| 2,318,838 | Conradson | May 11, 1943 |

FOREIGN PATENTS

| Number | Country | Date |
|---|---|---|
| 630,628 | Germany | May 14, 1936 |
| 644,023 | Germany | Apr. 1, 1937 |

OTHER REFERENCES

The American Machinist, May 14, 1942, pages 438–439.